United States Patent
Colgan et al.

[11] Patent Number: 5,831,710
[45] Date of Patent: Nov. 3, 1998

[54] LIQUID CRYSTAL DISPLAY

[75] Inventors: Evan G. Colgan, Chestnut Ridge; Minhua Lu, Mohegan Lake; Robert Lee Melcher, Mt. Kisco; James Lawrence Sanford, Chappaqua; Kei-Hsiung Yang, Katonah, all of N.Y.

[73] Assignee: International Business Machines Corporation, Armonk, N.Y.

[21] Appl. No.: 795,226

[22] Filed: Feb. 6, 1997

[51] Int. Cl.$^6$ ................................................ G02F 1/1339
[52] U.S. Cl. ........................... 349/156; 349/155; 349/157
[58] Field of Search .................................... 349/155, 156, 349/157

[56] References Cited

U.S. PATENT DOCUMENTS

| | | | |
|---|---|---|---|
| 4,150,878 | 4/1979 | Barzilai et al. | 349/156 |
| 4,458,987 | 7/1984 | Sasaki et al. | 349/155 |
| 4,775,225 | 10/1988 | Tsuboyama et al. | 349/155 |
| 4,842,377 | 6/1989 | Nakanawatari | 350/344 |
| 4,999,619 | 3/1991 | TeVelde | 340/784 |
| 5,105,290 | 4/1992 | Tomii et al. | 359/80 |
| 5,379,139 | 1/1995 | Sato et al. | 359/81 |
| 5,459,598 | 10/1995 | Carrington | 359/81 |

FOREIGN PATENT DOCUMENTS

| | | | |
|---|---|---|---|
| 0358142 | 3/1990 | European Pat. Off. | 349/155 |
| 2557718 | 7/1985 | France | 349/155 |
| 57-17923 | 1/1982 | Japan | 349/155 |
| 57-52026 | 3/1982 | Japan | 349/153 |
| 57-171319 | 10/1982 | Japan | 349/153 |
| 61-2130 | 1/1986 | Japan | 349/156 |
| 61-183625 | 8/1986 | Japan | 349/156 |
| 3-182718 | 8/1991 | Japan | 349/155 |
| WO 86/05283 | 9/1986 | WIPO | 349/156 |

OTHER PUBLICATIONS

IBM TDB vol. 32 No 7 Dec. 1989 pp. 114 & 115 "Seal Design for Liquid Crystal Display".

IBM TDB vol. 32 No. 5A Oct. 1989 p. 223 "Sealing Structure for Liquid Crystal Display".

Copending Appn. (IBM Y0994065) Colgan et al "A Reflective Spatial Light Modulator Array".

Glueck et al. "Color TV Projection with Fast Switching Reflective HAN–Mode Light Valves" 1992 SID Digest pp. 277–280.

Glueck et al "Improvement in Light Efficiency of a–Si:h TFT–Addressed Reflective λ14–HAN Mode Light Valves for Color TV" 1993 SID Digest pp. 299–302.

*Primary Examiner*—William L. Sikes
*Assistant Examiner*—Julie Ngo
*Attorney, Agent, or Firm*—Jay P. Sbrollini; Alvin J. Riddles

[57] ABSTRACT

A structural principle is described for control of the gap and the area around the periphery of a liquid crystal display by the formation of an insulating layer out of which, gap dimension maintaining posts and contaminant diffusion inhibiting segmented walls, remain after the display area is etched back out of the layer.

10 Claims, 3 Drawing Sheets

LIQUID CRYSTAL DISPLAY

FIELD OF THE INVENTION

The invention relates to the liquid crystal display device, known in the art by the acronym LCD, and in particular to a structural principle employed in the manufacture of such devices, and further in particular to LCDs very small in size.

BACKGROUND OF THE INVENTION AND RELATION TO THE PRIOR ART

In the liquid crystal display technology the liquid crystal makes contact with an electrically common translucent electrode which in turn is protected by a translucent protective cover. The circuitry is positioned under the liquid crystal material so that a portion of the liquid crystal rotates the polarization of light quantitatively in response to electrical stress between the pixel intersections in the circuitry and the common electrode.

As progress in the art is taking place there is a need to be able to reduce and to more tightly control the cell gap which is the vertical dimension of the space occupied by the liquid crystal, between the pixel circuitry intersection connection and the common electrode, and also to be able to extend the display area over as much as possible of the supporting substrate.

Heretofore in the art, efforts at controlling the cell gap dimension involved the use of insertable elements, with a dimension about that of the cell gap such as spacer balls and pillars, as described for example in U.S. Pat. Nos. 5,459,598 and 5,379,139. The use of such elements carries several downside aspects. The balls are not of uniform diameter causing inability to maintain precise tolerances. It is desirable that they be positioned and kept in place during the manufacture of high resolution displays. Any gap size spacer element will take up a significant portion of the display area if the spacer element is in the area of a pixel, for displays with very small pixels such as light valves used in projection displays.

Efforts to extend the display area over more of the substrate involve two problems. The first is that a better defined area is needed for a glue seal that attaches the cover and contains the liquid crystal material. The second is that liquid crystal deteriorating contaminants come out of the adhesive materials used to seal the cover onto the substrate in the display and degrade the liquid crystal.

SUMMARY OF THE INVENTION

The invention provides an intermediate product structural principle and process whereby gap establishing and maintaining members together with glue containment and a diffusion inhibiting segmented wall are produced in the construction that define a precise vertical gap over the display area and also reduce the distance previously set aside for adhesive and control of contaminants diffusing out of the adhesive which forms the glue seal.

In the invention, a layer equivalent to the desired gap thickness, is formed by deposition or growth on the surface of the substrate to be the display area, the layer is then pattern etched to leave gap height establishing posts integral with the substrate at as many locations as are desired in the area of the display, and, around the periphery of the display area, staggered parallel row barriers, also integral with the substrate are formed that are to serve as glue containment and a diffusion barrier. An adhesive or glue seal is placed around the periphery of the display area, outside of the barriers. A cover with a transparent counter electrode on the side next to the liquid crystal is positioned, supported by the posts and barriers and retained by the adhesive seal. The cell gap space is then filled with liquid crystal to the adhesive seal. The barrier increases the distance through which glue and a contaminant diffusing out of the adhesive must travel through the liquid crystal to reach the liquid crystal in the active area of the display.

BRIEF DESCRIPTION OF THE DRAWINGS

FIGS. 3–6 are illustrations of the intermediate product at individual manufacturing steps in the invention; wherein:

FIG. 3 is an illustration of the deposited or grown layer of the invention on a substrate.

FIG. 4 is an illustration of the intermediate product after a pattern etch back of the layer of the invention, in which the integral gap setting and diffusion barrier elements of the display have been provided.

FIG. 5 is an illustration of the intermediate product after the cover with common electrode have been positioned and attached with an adhesive.

FIG. 6 is an illustration of the intermediate product after filling the gap at all pixel locations with liquid crystal.

DESCRIPTION OF THE INVENTION

In the invention, a layer is provided having a thickness of the gap of the liquid crystal display, on a common support portion of the display, that layer is then etched back to the common support portion in a pattern of posts and diffusion barrier members that are integral with the support portion, that then serve to support the external cover and set the gap distance. The diffusion barrier members also serve to reduce the distance needed to contain the adhesive and prevent contaminants that come from the adhesive that attaches the external cover to the display from contaminating the liquid crystal in the active display area that occupies the gap space when the liquid crystal display is completed.

Figure 1:
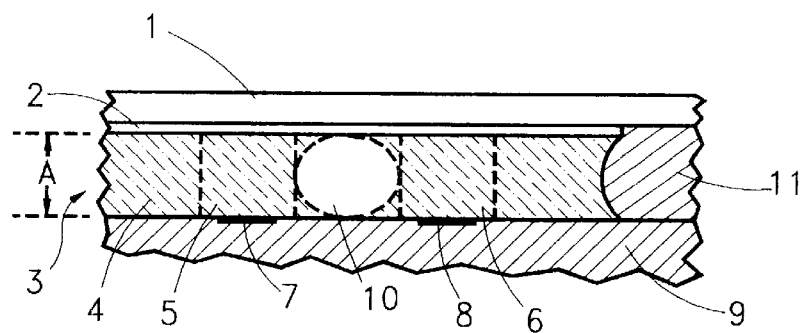
FIG. 1, labelled prior art, is a cross sectional illustration of the present state of the art considerations involved with the gap and with the useable area in an active matrix liquid crystal display.

The invention simultaneously provides a solution to several problem considerations encountered in the constructing of a liquid crystal display. Referring to FIG. 1 an illustration, labelled prior art, is provided to establish a perspective concerning the current considerations encountered in making liquid crystal displays. In the display, under an external translucent cover 1, there is a common translucent electrode 2. Occupying a gap 3 there is a quantity of liquid crystal material 4, shown with dash hatching. The display is made up of an area of pixels of which two, 5 and 6, are shown bounded by heavy dotted lines. The amount of change in light transmittal of the liquid crystal 4 in the pixel is responsive to electrical stress across the liquid crystal 4 between a contact, of which 7 and 8 are shown for pixels 5 and 6 respectively, and the common electrode 2. The assembly is shown schematically supported by a substrate 9, which in some constructions, in addition to circuitry that provides x and y data and gate line signal amplified intersections at the contacts 7 and 8, can also provide light under the liquid crystal in the pixel. The substrate 9 may be the surface of any embedded wiring and light conducting channel type structure including the surface of a semiconductor wafer. A general construction consideration is that the gap dimension, labelled "A", that is the dimension through the liquid crystal between the contact, 7,8, in the substrate 9 and the common electrode 2, must be precisely selectable and tightly controllable over the entire active area of the display. The objects that establish the gap must not only provide support and space for a sufficient pixel quantity of liquid crystal in all constructions but also may have to be relied on for establishing an optical path distance in some constructions. At the present development of the art the use of a ball with a diameter related to the desired gap dimension is employed. In FIG. 1 a ball 10 is shown dotted as an example in an example position between pixels. The balls are slightly larger than the desired gap dimension and are compressed when the cover is applied. At the present state of the art the available balls are not of uniform diameter which affects the ability to maintain precise tolerances. In manufacture the balls are randomly sprayed with the result that some may be in pixel areas where they will block light, especially with high resolution displays where the pixel size is comparable to the spacer ball diameter. It is also desirable to extend the area of the pixels, 5 & 6, making the display fill as much of the substrate 9 area as possible. The ability to do this has been limited because adhesive is not contained and contaminants diffuse out of any adhesive 11 used to bond the cover 2 at the edge of the substrate 9. The contaminants operate to affect performance and reliability by reducing the resistivity of the liquid crystal, allowing charge transport and thus reducing the magnitude of electrical stress across the liquid crystal.

In accordance with the invention a layer of insulating material of the thickness of the desired gap dimension, is formed by deposition or growth on the surface of the electrode side of the cover or the supporting base of the display device serving as a substrate that is to contain the display area, the layer is then pattern etched to the substrate leaving; gap establishing and retaining posts formed out of the layer in situ and thus integral with the substrate at as many support locations as are desired, and, a diffusion barrier between the display and the peripheral edge of the substrate where an adhesive that is to retain the cover is to be applied. The diffusion barrier is also made up of elements formed out of the layer in situ and thus integral with the substrate in a configuration such as a staggered parallel wall of segments, all the height of the deposited layer or the desired gap dimension "A". The staggered row diffusion barrier wall configuration permits gas to escape from the gap space through the segment separations in the wall before the gap space is filled.

Figure 2:
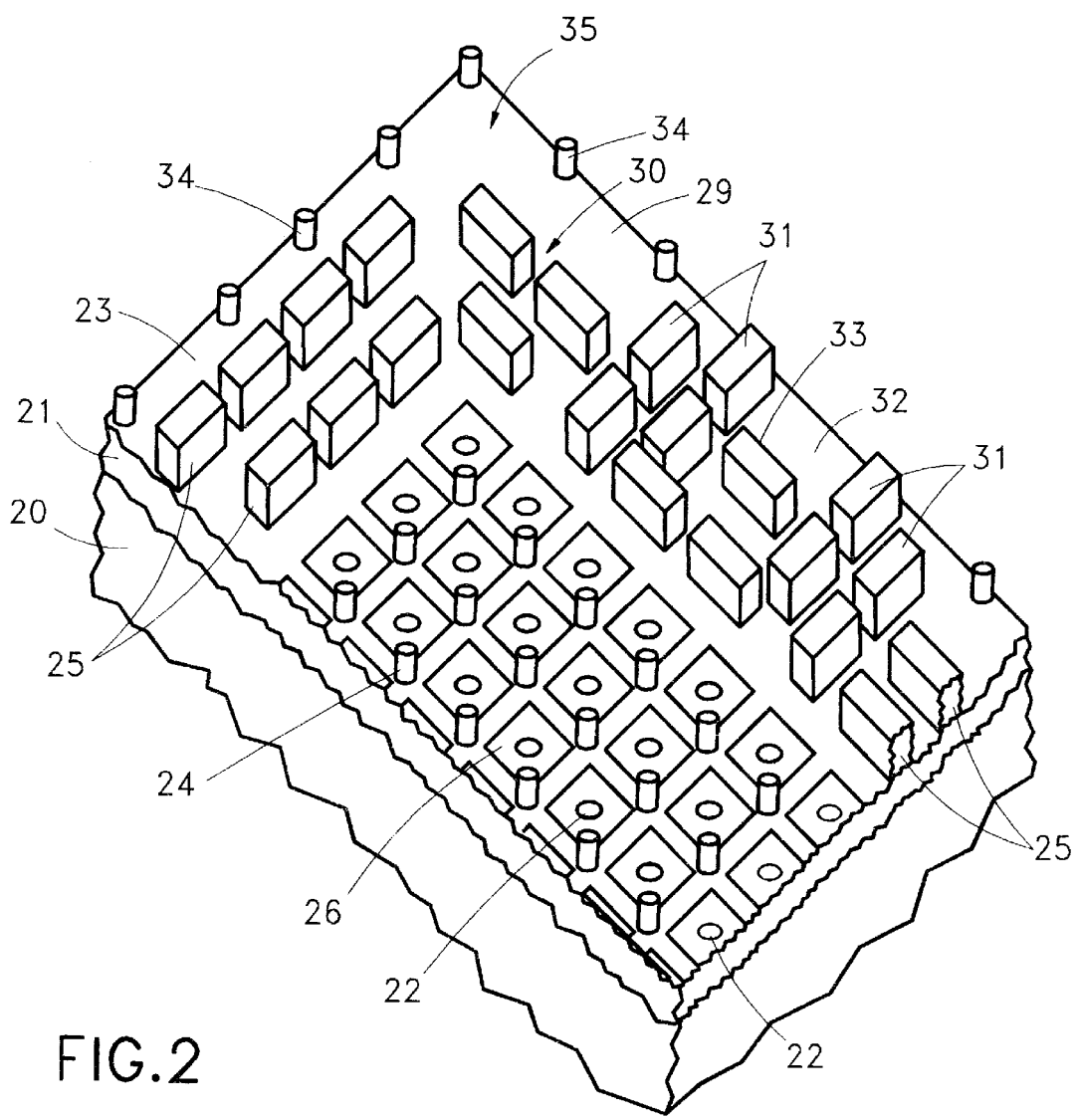
FIG. 2 is a perspective view of the intermediate product of the invention at the etched back layer stage.

The intermediate product in accordance with the invention, after the etch back operation, is illustrated in perspective in FIG. 2, before a cover and common electrode such as 1 and 2 of FIG. 1 would be applied and before the gap space is filled with liquid crystal.

In FIG. 2 on a portion of a substrate 20, on an example, thin etch stop layer 21, such as a silicon nitride layer, a layer of an etchable insulating material having a thickness of the desired vertical dimension of the gap is formed for example by deposition or growth on the etch stop layer 21 on the substrate 20. The layer has all been pattern back etched away in this Figure below the pixel electrodes 22 down to the face 23 of the etch stop layer 21 except for posts 24 and opening containing, segmented barriers 25 at selected locations which were protected from the etch. In each pixel location in the array 26 in the face 23, there is indicated the pixel electrode 22, of which 15 are shown, for a reach through contact to the display circuitry in the substrate 20. The substrate 20 in turn contains the, not shown, circuitry for the display. The posts 24, of which 15 are shown, are located as an example at intersections in the pixel array 26 and can be sufficiently small as not to interfere with the narrowest of pixel separations, for example a micrometer diameter. The barrier segments 25, of which 11 are shown, are arranged in an example two parallel row barrier staggered wall configuration where the relative segment lengths, widths and gaps can be arranged to inhibit contamination diffusion through the wall while permitting gas escape through the wall. The barriers 25, 31 and 33 and the posts 24 and 34 are integral with the substrate 20, and are the gap space vertical dimension "A".

In the liquid crystal display technology the filling of the display in the gap with the liquid crystal material is done at the center of one side as shown. It will be apparent in accordance with the invention that there is considerable flexibility in positioning, in quantity and in size of the posts and barrier segments. As one illustration, some barrier wall segments 31 can also be arranged to guide and facilitate flow of the liquid crystal in the fill area 32. As a further illustration the quantity, size and location of the spacer posts 24 and 34 is quite flexible. They can be as narrow as the separation between pixels. Additional or fewer posts is accomplished by merely adding or removing mask areas in the etch back operation. The height is always the gap size, dimension "A". The shape and arrangement of the barrier segments 25, 31 and 33 is to provide a barrier to the diffusion of contaminants from an adhesive, not shown, located in the region 29 at the peripheral edge of the face 23 and to permit a gas to move through openings or interruptions 30 in the segmented wall. While the wall segments 25 are shown in parallel staggered rows other configurations that would inhibit a diffusion path would be satisfactory. Any wall segment or post 34 of which 8 are shown can be relied on for cover support where desired. Any distance separating the active area of the liquid crystal from the cover retaining adhesive where the invention is employed would not only be much shorter than heretofore in the art, but also fully predictable.

In FIGS. 3–6 there are provided illustrations at the fabrication steps for the back etched layer structure that are common to liquid crystal displays, through cross sectional views of the intermediate product at individual manufacturing process steps in the invention. Additional processing steps for unique displays are not shown.

Figure 3:
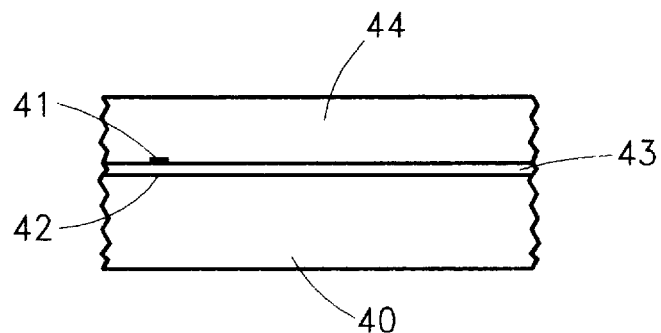

Referring to FIG. 3 there is an illustration of the layer of uniformly etchable insulating material, for example an oxide of silicon such as SiO2, that is deposited or grown by a techniques such as Plasma Enhanced Chemical Vapor Deposition known in the art as PECVD. Further, in FIG. 3 there is provided a substrate 40 which may be for example a silicon semiconductor chip with embedded display matrix circuitry with pixel contacts 41, of which one is shown, on a thin etch stop layer 43 over surface 42. The etch stop layer 43 is of a relatively slow, relative to for example the SiO2, etchable material, such as a thin layer of silicon nitride. A layer 44 corresponding to the etched away layer of FIG. 2 of insulating material for example an oxide of silicon such as SiO2 is grown or deposited in a thickness that is the desired gap dimension "A" of the to be formed display. The material of the layer 44 must be insulating to prevent any shorting out of the electrical stress to be applied across the pixels in the finished display. The material of the layer 44 must have a faster etch rate than the relatively slow rate of the layer 43 and the pixel electrodes 41 to be able to rely on the etch ratio of the materials for stopping etching of the layer 44 at the layer 43, surface 42.

Figure 4:
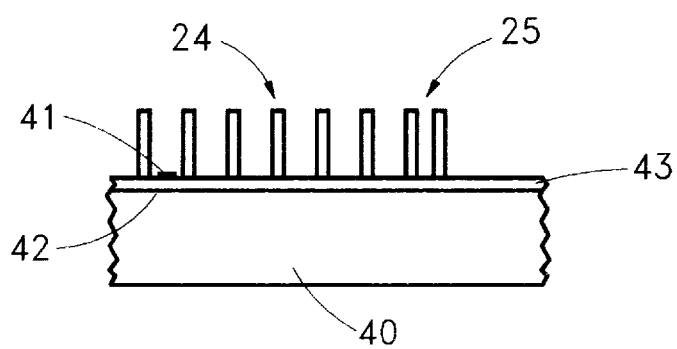

Referring to FIG. 4 there is an illustration of the intermediate product after a pattern etch back of the layer 44 to the etch stop thin layer 43 and pixel contact 41 on the substrate surface 42. The etch back is performed using standard in the art chemical or reactive ion etching through masking and etches away the layer 44 to the layer 43 on surface 42 which corresponds to the face 23 of FIG. 2, leaving the posts 24 and barriers 25, which were protected by a patterned resist.

Figure 5:
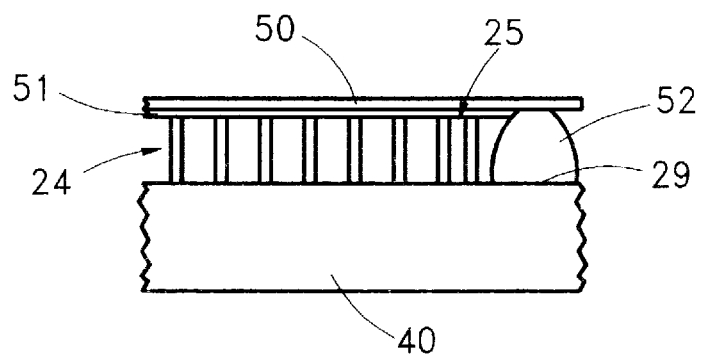

In FIG. 5 there is an illustration of the intermediate product after the cover 50 and translucent common electrode 51 have been positioned and have been attached to the peripheral portion 29 of the substrate, 40 corresponding to the substrate 20 of FIG. 2, with the adhesive 52. The wall segment rows 25 of which two are shown are staggered as shown for elements 25 in FIG. 2 which operates to inhibit diffusion out of the adhesive 52 toward the pixel locations beyond the wall segment rows 25 and thereby to reduce the unused space alloted to avoid contamination in the active area.

Figure 6:
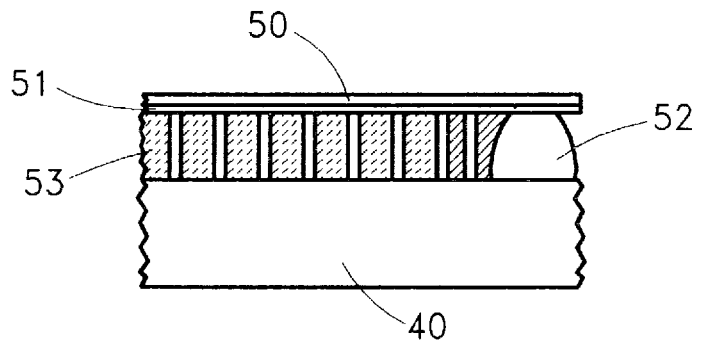

Referring to FIG. 6 there is an illustration of the intermediate product after filling the gap at all pixel locations with liquid crystal 53.

Figure 7:
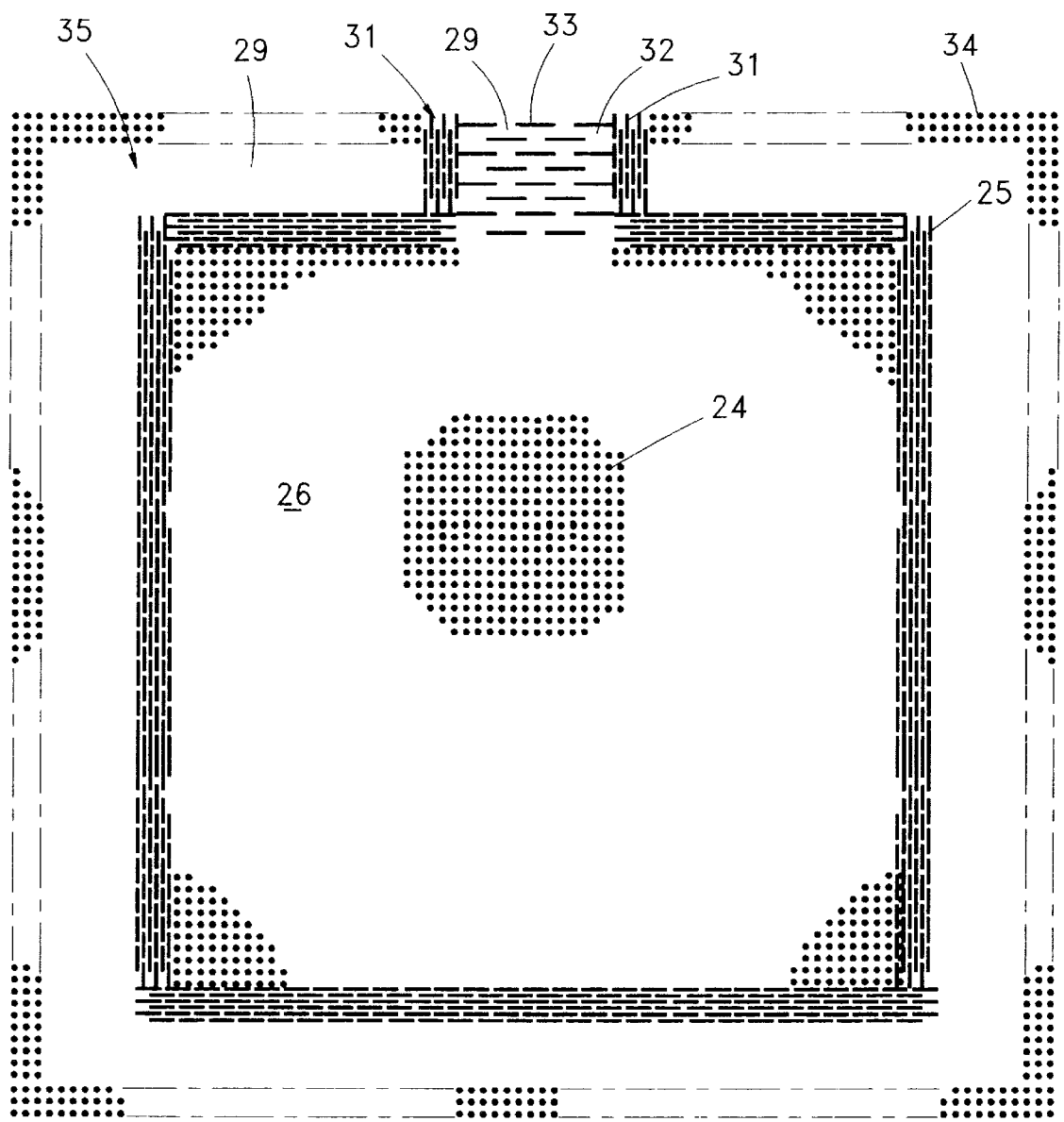
FIG. 7 is a schematic design arrangement of the spacer posts and barrier wall segments of the invention.

Referring to FIG. 7 there is shown a schematic illustration of a design arrangement of spacer posts and wall barrier segments for cover support, gap control, glue containment and glue contaminant reduction into the liquid crystal. In the schematic illustration of FIG. 7 the different sizes and positioning of the posts 24 and 34 and of the barrier wall segments 25, 31 and 33 are illustrated. The barrier wall segments 33 are loosely spaced and serve to reduce contaminants from the final glue application in the region 29 at the peripheral edge after the display area has been filled with liquid crystal through the area 32. The peripheral spacer posts 34 allow excessive glue 35 in the region 29 to flow out. Spacer barrier segments 25 and 31 provide for glue containment to keep it away from the array 26 and to keep the glue away from the liquid crystal in the array 26 area.

To provide additional information in practicing the invention, referring to FIGS. 2–7, the following specifications are provided as an illustration.

The substrate 20 may be a single crystal semiconductor such as Silicon having embedded wiring for a display of 2048×2048 pixels, each approximately 17 micrometers on a side with approximately 2 micrometers separation, and with a contact to a standard, transistor, capacitor (not shown), wiring matrix intersection, at each pixel location.

The layer 44, equivalent to the gap dimension "A" is approximately 2.5 micrometers of an oxide of silicon.

The posts 24 are approximately 1.5 micrometers in diameter and have a height equal to the gap of approximately 2.5 micrometers, each located at the intersection of the spacing between pixels. The outside posts 34 can have a larger diameter if desired. The dimensions are more relaxed outside the display area.

The wall segment parallel rows 25 and 31 are made up of segments each approximately 10 micrometers in width, 500 micrometers in length, with a 90 micrometer separation 30 between segments and a 100 micrometer separation between rows.

The translucent cover is glass.

The translucent electrode can for example be Indium Tin Oxide.

The liquid crystal is of the twisted nematic type in a layer approximately 2.5 micrometers thick.

It will be apparent that while in FIGS. 1–7 the spacer post and barrier fabrication is described for clarity as using the circuit bearing substrate as a base, the fabrication can also be performed on the translucent electrode on the translucent protective cover. Translucent conductor materials have excellent etch stopping properties of the etchants used to etch the material deposited or grown on the translucent conductor layer to provide the spacer and barrier members. The spacer posts are integral with the translucent cover and translucent conductor combination but are positioned with the pixel arrangement on the substrate as a consideration. In assembly there is freedom to use various covers, spacer heights and barriers.

What has been described is a structural principle for control of the gap and the area around the periphery of a liquid crystal display by the formation of an insulating layer out of which, gap dimension maintaining posts and adhesive contaminant diffusion inhibition segmented walls, remain after the display area is etched back out of the layer.

What is claimed is:

1. In a liquid crystal display structure having a gap between a supporting member with an array of pixel elements and a conductive layer on one side of a cover, said cover being sealed to said supporting member with an adhesive around the periphery of said array of pixel elements, the improvement comprising:
said supporting member having a plurality of grown posts extending from said supporting member a distance that defines said gap, said grown posts being positioned in said array between said pixel elements and around the outside of said adhesive, and,
said supporting member having at least one grown barrier member that is positioned between said array of pixel elements and said adhesive, each said grown barrier member having a height dimension extending above said supporting member equal to said gap.

2. The improvement of claim 1 wherein said at least one grown barrier member is a plurality of barrier members arranged in a parallel staggered row configuration.

3. The improvement of claim 1 wherein said at least one grown barrier member is a plurality of barrier members positioned both within and in an area essentially surrounding a fill area that is approximately centered on one side of said display structure.

4. In a liquid crystal display structure having a gap between a supporting member and a conductive layer on one side of a cover, the intermediate manufacturing product comprising:
said supporting member having a circuitry bearing display area of pixel locations on a surface with a sealing region around the periphery,
said conductive layer on said cover having plurality of grown posts extending integral with said conductive layer a distance that defines said gap, and,
said conductive layer on said cover further having at least one grown barrier member extending integral with
said conductive layer at a location corresponding to a region between said display area and said sealing region, each said barrier member having a height dimension extending from said conductive layer a distance equal to said gap.

5. The intermediate manufacturing product of claim 4 wherein said at least one grown barrier member is a plurality of barrier members arranged in a parallel staggered row configuration.

6. The intermediate manufacturing product of claim 4 wherein said at least one grown barrier member is a plurality of barrier members positioned both within and in an area essentially surrounding a fill area that is approximately centered on one side of said display structure.

7. The process of fabricating an intermediate manufacturing product in a liquid crystal filled display having a cover separated by a gap dimension from a supported display array of pixels with an adhesive sealing the cover to the display support around the periphery, comprising the steps of:

forming by vapor growth, a grown insulating layer of an oxide of silicon the thickness of said gap dimension on one, of an etch stop layer on a display support of silicon, and a transparent conductive layer on said cover, pattern back etching to one of said etch stop layer and said conductive layer a portion of said grown silicon oxide insulating layer between mask protected regions, said mask protected regions being, distributed grown post elements positioned at least in said display area, and, grown diffusion barrier elements positioned at least around the periphery of said silicon display support.

8. The process of fabricating an intermediate manufacturing product in a liquid crystal filled display having a cover separated by a gap dimension from a supported display array of pixels with an adhesive sealing the cover to the display support around the periphery, comprising the steps of:

forming by vapor growth, a grown insulating layer the thickness of said gap dimension on one of an etch stop layer on said display support and a transparent conductive layer on said cover, pattern back etching to one of said etch stop layer and said conductive layer a portion of said grown insulating layer between mask protected regions, said mask protected regions being, distributed grown post elements positioned at least in said display area, and, grown diffusion barrier elements positioned at least around the periphery of said display support.

9. The process of claim 8 wherein said vapor growth is by plasma enhanced chemical vapor deposition.

10. The process of claim 8 wherein said cover is of glass and said conductive layer is of indium tin oxide.

* * * * *